(12) United States Patent
Bruck

(10) Patent No.: US 8,511,751 B2
(45) Date of Patent: Aug. 20, 2013

(54) HEADREST EXHIBITING A WIDTHWISE BAR ENGAGING SIDE SECTORS IN COMBINATION WITH A STRAP ENGAGING/LIFT FEATURE FOR PERMITTING FORWARD AND/OR REARWARD DUMP

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 304 days.

(21) Appl. No.: 13/088,657

(22) Filed: Apr. 18, 2011

(65) Prior Publication Data

US 2011/0254339 A1 Oct. 20, 2011

Related U.S. Application Data

(60) Provisional application No. 61/325,603, filed on Apr. 19, 2010.

(51) Int. Cl.
*A47C 7/36* (2006.01)

(52) U.S. Cl.
USPC .......................................... 297/408; 287/391

(58) Field of Classification Search
USPC ........................... 297/331, 334, 403, 408, 391
See application file for complete search history.

(56) References Cited

U.S. PATENT DOCUMENTS

| | | |
|---|---|---|
| 5,669,668 A | 9/1997 | Leuchtmann |
| 6,045,181 A | 4/2000 | Ikeda et al. |
| 6,129,421 A * | 10/2000 | Gilson et al. ................... 297/408 |
| 6,702,385 B2 | 3/2004 | Holdampf et al. |
| 6,902,232 B2 | 6/2005 | Kamrath et al. |
| 6,935,696 B2 | 8/2005 | Gauthier et al. |
| 7,325,877 B2 | 2/2008 | Brockman et al. |
| 7,341,312 B2 | 3/2008 | Gauthier et al. |
| 7,422,280 B2 | 9/2008 | Brockman |
| 7,445,289 B2 | 11/2008 | Neale |
| 7,543,891 B2 * | 6/2009 | Chung ........................... 297/408 |
| 7,575,282 B2 | 8/2009 | Sutter, Jr. et al. |
| 8,083,291 B2 * | 12/2011 | Yoshida ......................... 297/408 |
| 2008/0036263 A1 | 2/2008 | Little |
| 2008/0258532 A1 | 10/2008 | Cassaday |
| 2008/0277989 A1 * | 11/2008 | Yamane et al. ................ 297/408 |
| 2008/0284225 A1 | 11/2008 | Gauthier et al. |
| 2009/0184555 A1 | 7/2009 | Yetukuri et al. |
| 2009/0289489 A1 | 11/2009 | Sutter, Jr. et al. |
| 2009/0295211 A1 | 12/2009 | Granath |
| 2010/0078972 A1 * | 4/2010 | Sayama .......................... 297/61 |

* cited by examiner

*Primary Examiner* — David Dunn
*Assistant Examiner* — Timothy J Brindley
(74) *Attorney, Agent, or Firm* — Gifford, Krass, Sprinkle, Anderson & Citkowski, P.C.; Douglas J. McEvoy

(57) ABSTRACT

A pivoting headrest including a pair of upwardly projecting supports associated with a vehicle seatback and terminating in a pair of spaced apart sectors. A headrest bun supporting frame is pivotally secured to the sectors and includes a pair of elongated and side extending structural supports and a lower interconnecting housing. A widthwise extending bar is disposed relative to the housing, opposite extending ends of which engage the sectors at a first upright position and seat within channels in the side supports. The bar is biased in a first engaging direction against the sectors and, upon being displaced in a reverse direction, causes its ends to unseat from the sectors and the bun to rotate about the sectors to a dump position.

20 Claims, 7 Drawing Sheets

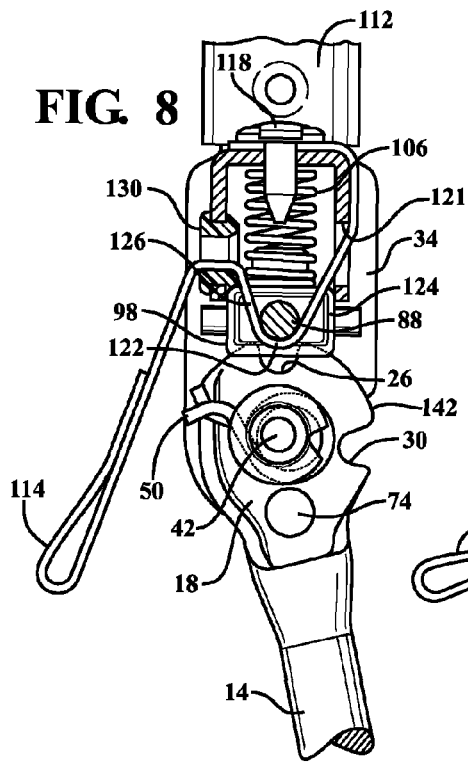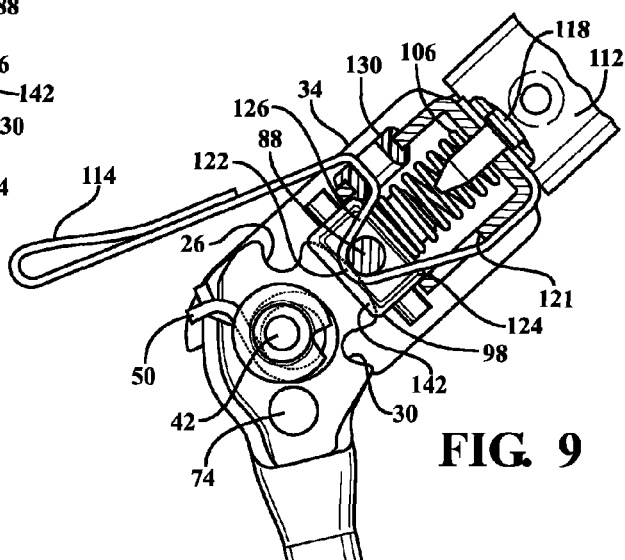

HEADREST EXHIBITING A WIDTHWISE BAR ENGAGING SIDE SECTORS IN COMBINATION WITH A STRAP ENGAGING/LIFT FEATURE FOR PERMITTING FORWARD AND/OR REARWARD DUMP

CROSS-REFERENCE TO RELATED APPLICATIONS

This application claims the benefit of U.S. Provisional Application 61/325,603 filed on Apr. 19, 2010.

FIELD OF THE INVENTION

The present invention discloses a slim profile headrest design which incorporates a unique lift and rotate feature of a widthwise extending engagement bar for accomplishing either or both rearward and forward folding of the headrest bun relative to the fixed sector supports, such as to permit a rear row seat to be forwardly rotated without the headrest abutting the back of a forward seat. The widthwise extending bar is disposed in a biased and elevatable fashion within a widthwise extending housing associated with the headrest base, with opposite ends of the bar laterally engaging the sector supports. Lifting or elevating the bar results from pulling on a strap wrapped around an underside midsection of the bar, thus causing its projecting ends unseat from the sectors and, upon clearing an engagement location established on either or both side disposed sectors, allowing the headrest rods and width extending housing to rotate about the side support sectors to the rearward (or forward) dump position.

BACKGROUND OF THE INVENTION

The prior art discloses a variety of folding or articulating headrest assemblies, notable among these being the foldable seat headrest assembly of Little, U.S. Pub. No. 2008/0036263. Additional folding headrest designs include such as those disclosed in U.S. Pat. No. 5,669,668 to Leuchtmann and U.S. Pat. No. 7,445,289 to Neale. Other types of folding headrests incorporating some form of latch construction include such as those set forth in each of U.S. Pat. No. 7,575,282 and U.S. Pub. No. 2009/0289489, both to Sutter, Jr., as well as U.S. Pat. Nos. 7,341,312 and 6,935,696, both to Gauthier.

SUMMARY OF THE INVENTION

The present invention discloses a pivoting headrest including a pair of upwardly projecting supports associated with a vehicle seatback and terminating in a pair of spaced apart sectors. A headrest bun supporting frame includes such as a "U" shaped tubular component and is pivotally secured to the sectors via a pair of elongated and side extending structural supports and a lower interconnecting housing.

A widthwise extending bar is disposed relative to the housing, opposite extending ends of which engage the sectors at a first upright position and seat within channels in the side supports. The bar is biased in a first engaging direction against the sectors and, upon being displaced in a reverse direction, causes its ends to unseat from the sectors and the bun to rotate about the sectors to a dump position.

Additional features include the sectors exhibiting a first pair of edge configured notches corresponding to an upright design position and a second arcuately offset pair of notches corresponding to a rotated fold position. A strap is connected at a first end to the housing, extends within the housing and underneath the lift bar, and projects from a further rearward surface of the housing before terminating in a projecting loop end accessible from a rear of the headrest and which, upon being pulled, upwardly displaces the rod along the side support channels in order to unseat from the selected pair of notches defined in the sectors.

A widthwise extending shell is provided through which extends a central portion of the rod. A pair of spaced apart bushing supports extend from the shell and in turn seat thereupon a pair of compression springs exerting a biasing force against a top underside of the housing and in order to bias the rod into engagement with the side sectors.

A pair of rivets establish pivotal engagement between the headrest bun support frame and the sectors, with a selected rivet further comprising an elongated and inwardly extending stem upon which is seated a torsion spring. A first end of the spring engages a location established upon a proximately located sector at a location offset from its pivotal location, with a second end engaging a location associated with the housing and in order to bias the housing to the dump position.

Stop rivets project from exterior surfaces of the sectors, with the pivotally secured side members associated with the headrest frame each further exhibiting bottom edge configurations which abut the stop rivets in the upright position. Additional shoulder locations associated with the side members abut the stop rivets in the rotated dump position. Also disclosed are front and rear cover portions assembled over the pivotal housing and through which projects the tubular component, the looped end of the strap extending through an opening associated with a rear assembled cover portion.

BRIEF DESCRIPTION OF THE DRAWINGS

Reference will now be made to the attached drawings, when read in combination with the following detailed description, wherein like reference numerals refer to like parts throughout the several views, and in which:

FIG. 8 is an enlarged, assembled and side cutaway view of the headrest as previously depicted in the upright design position of FIG. 4 and better showing the configuration of the strap for facilitating upward displacement of the widthwise extending locking rod counter its spring biased and in order to unseat from a first pair of notches associated with opposite side supported sectors;

FIG. 9 is a succeeding illustration to that shown in FIG. 8 and in which the headrest side supports are shown in an intermediate folding position; and FIG. 10 is a further succeeding illustration similar to that depicted in FIG. 6 and showing the locking rod in a seating position relative to a second pair of notches associated with the side supported sector in the forward rotated position.

DETAILED DESCRIPTION OF THE PREFERRED EMBODIMENTS

Figure 1:
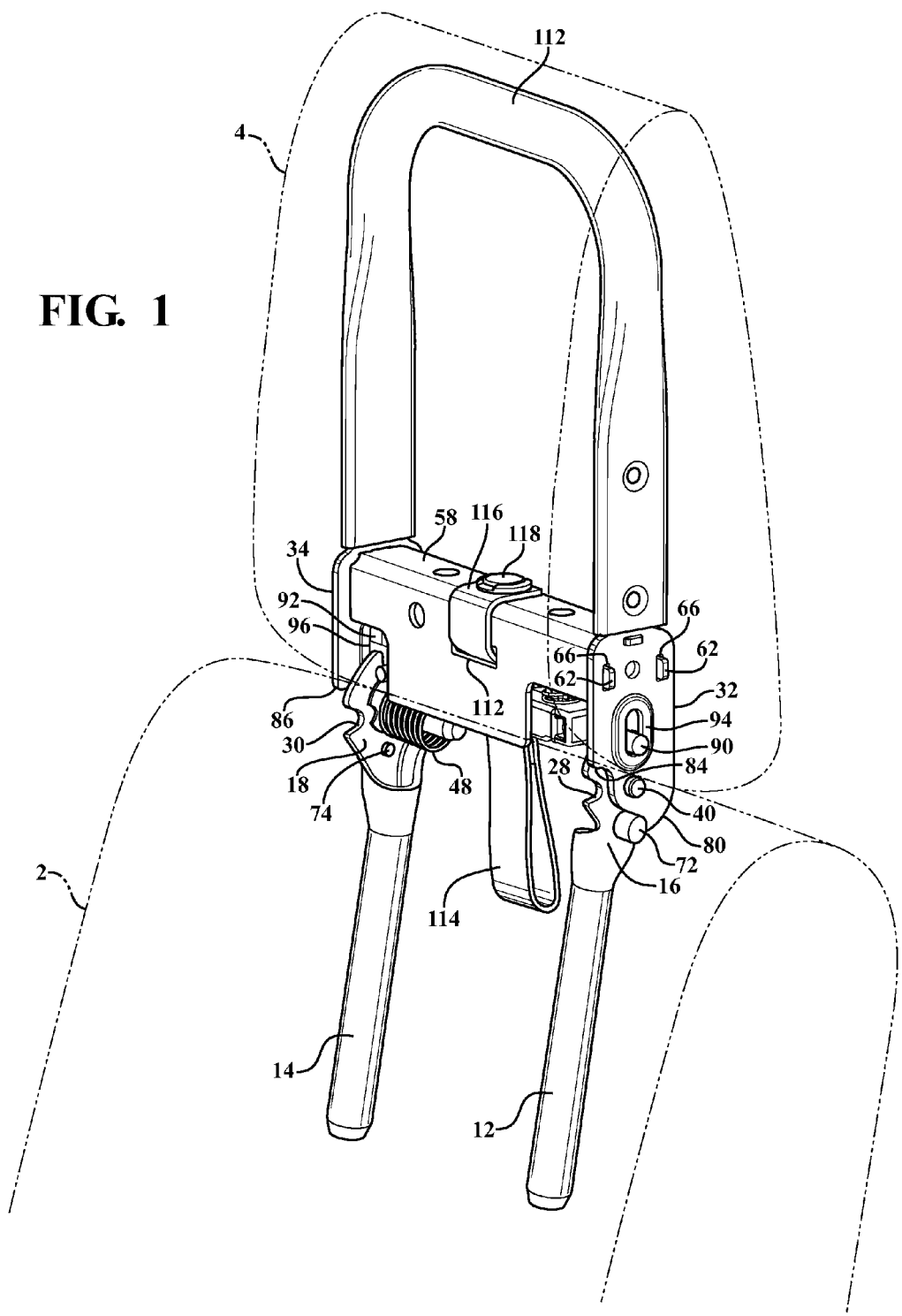
FIG. 1 is a front perspective of the pivoting headrest according to the present invention.
Figure 2:
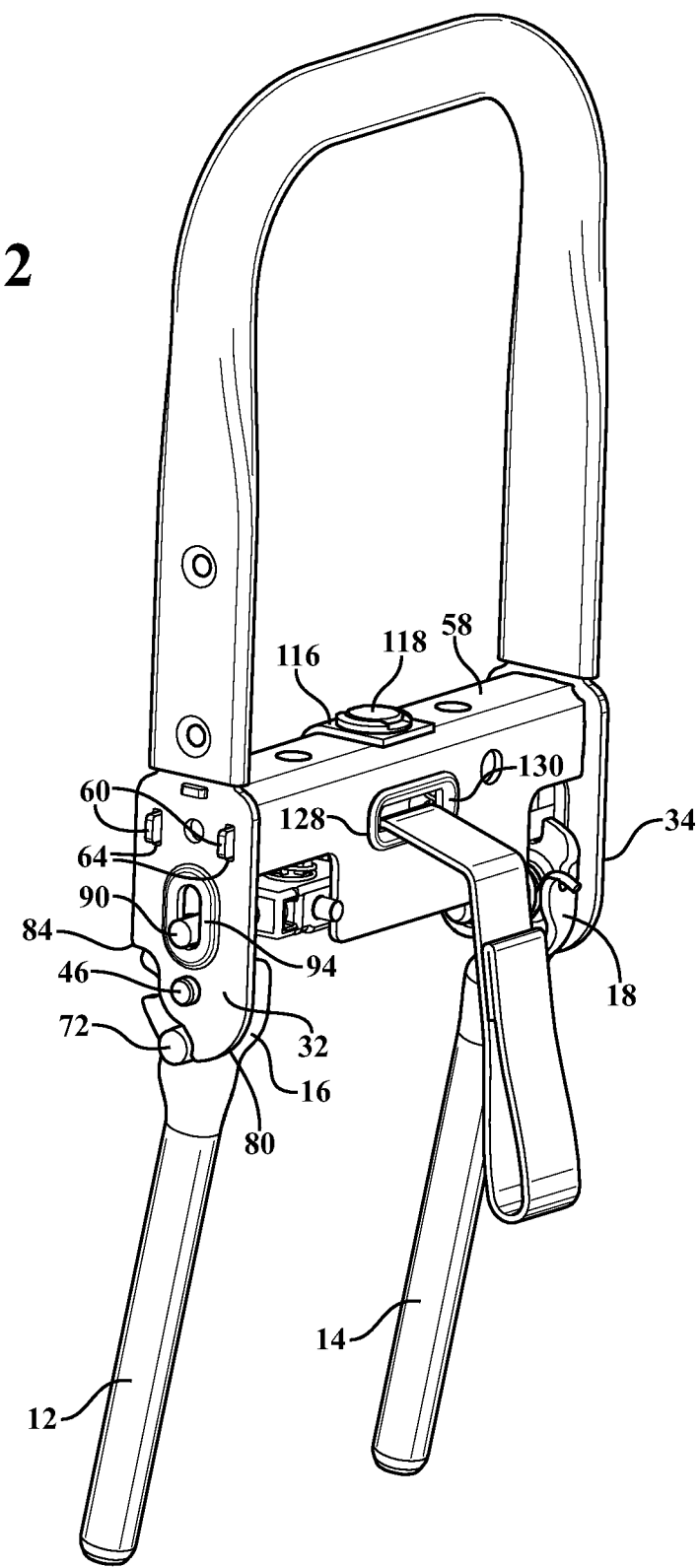
FIG. 2 is a rotated rear perspective of the headrest shown in FIG. 1.
Figure 3:
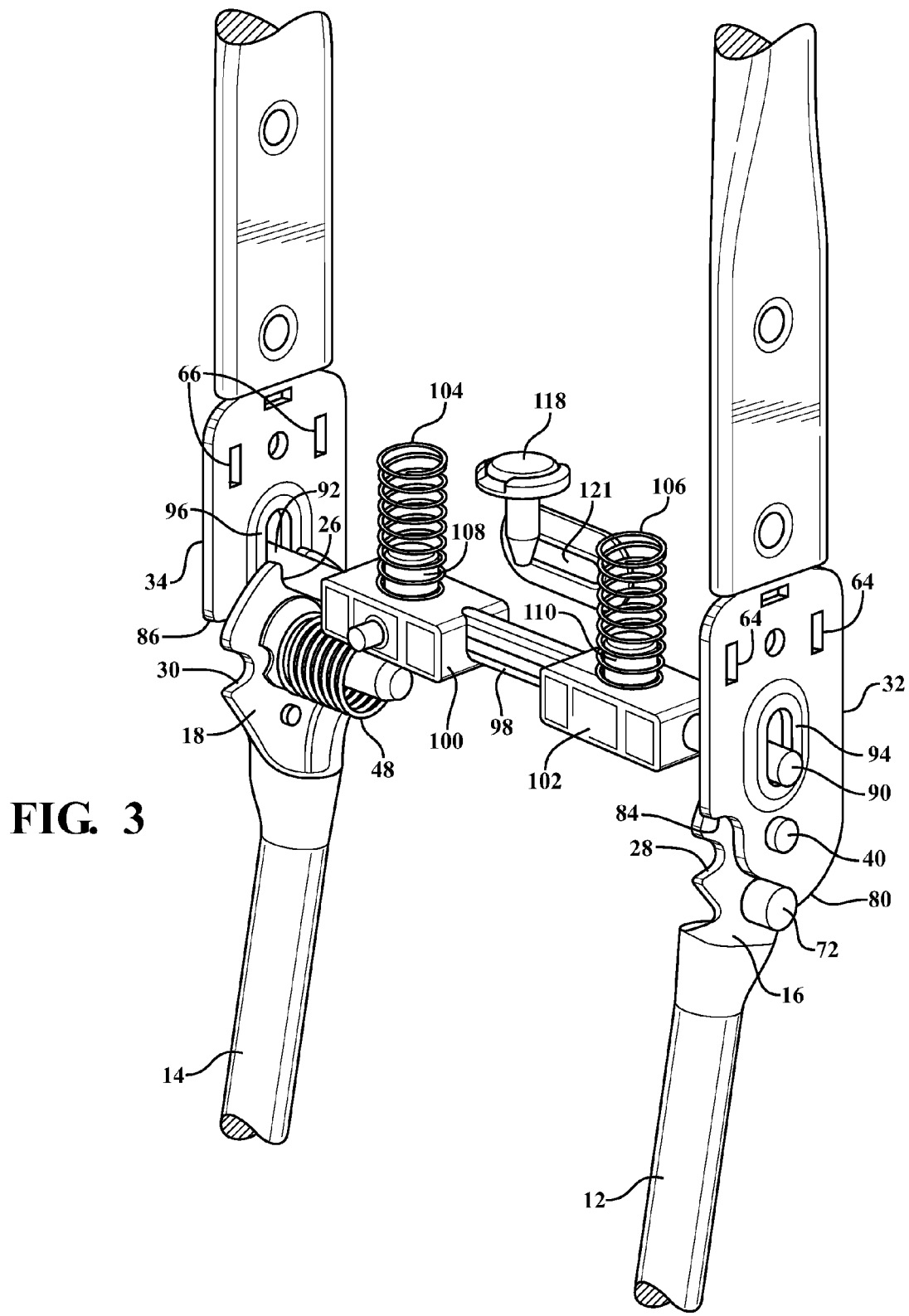
FIG. 3 is an enlarged perspective of the headrest depicted in FIG. 1 with crosswise extending latch housing removed and better depicting the feature of the spring biased and upwardly displaceable lift bar with opposite projecting ends supported in engaging fashion with spaced apart and supporting side sectors.
Figure 4:
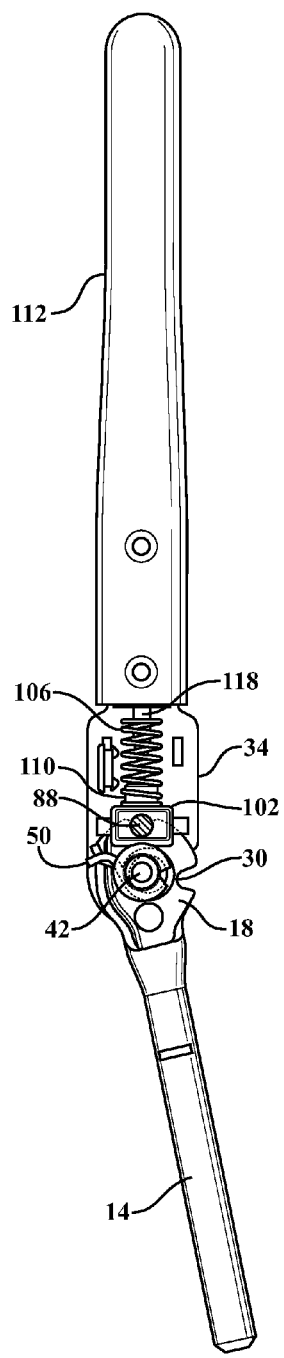
FIG. 4 is a side illustration of the headrest in an upright position.
Figure 5:
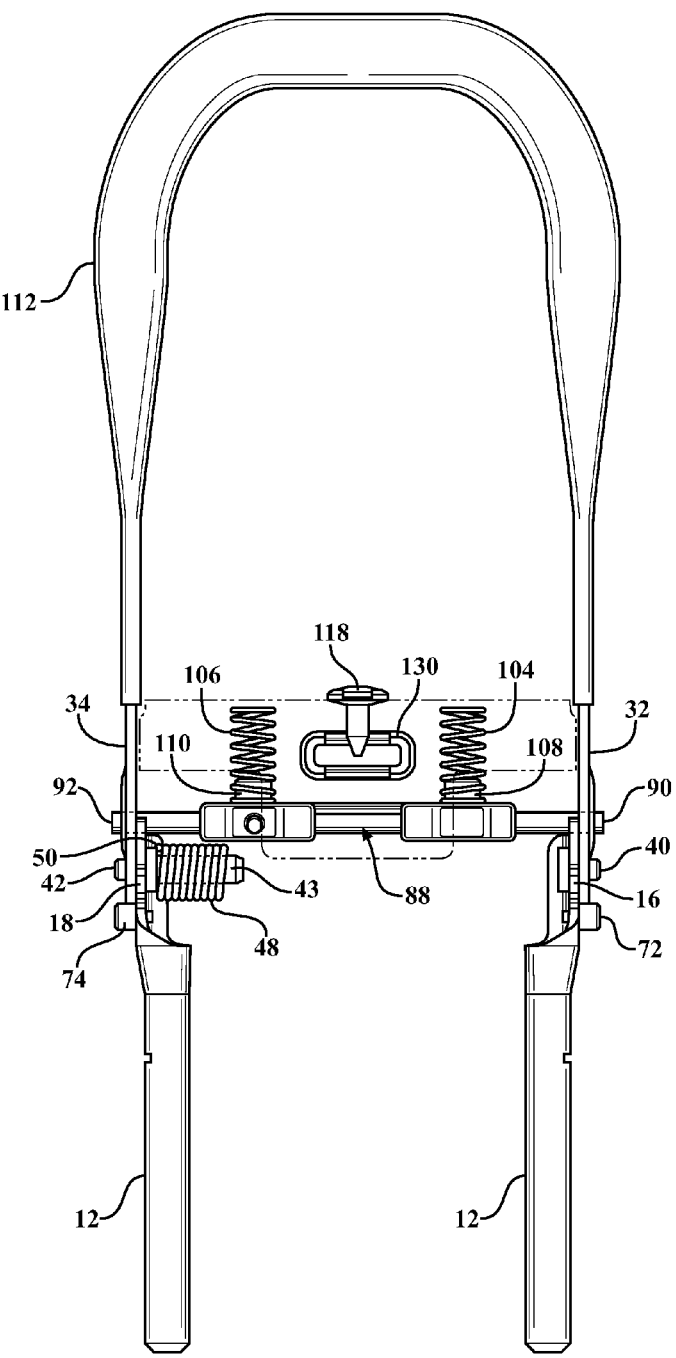
FIG. 5 is a front plan illustration of the headrest in the upright position.

With reference to the following illustrations, the present invention discloses a slim profile and pivoting headrest, generally shown at 10 in each of FIGS. 1 and 2, and which can be incorporated into any vehicle headrest (such as without limitation a rear row seat) for rotation from an upright design position to either of forward or rearward non-use (rotated or dump) positions. In operation, the associated seatback is usually forwardly rotated, either concurrently with or subsequent to the time the headrest is rotated to the non-use position, without the headrest abutting the back of a forward located seat. The various components of the headrest are constructed of a grade steel or like material, with the exception of the pull strap employed. That said, other materials can be substituted within the scope of the invention.

A pair of fixed and elongated supports are provided at 12 and 14 extend upwardly from a top frame supporting location associated with an associated seatback (depicted in phantom at 2 in FIG. 1) and terminate in first 16 and second 18 upper arcuate edge defining sectors. Although not clearly depicted, it is understood that the downwardly extending and fixed supports 12 and 14 embedded within the seatback are secured to an internal frame construction associated with the seatback and such that the sectors 16 and 18 are located proximate exposed surface locations of the seatback 2.

Figure 7:
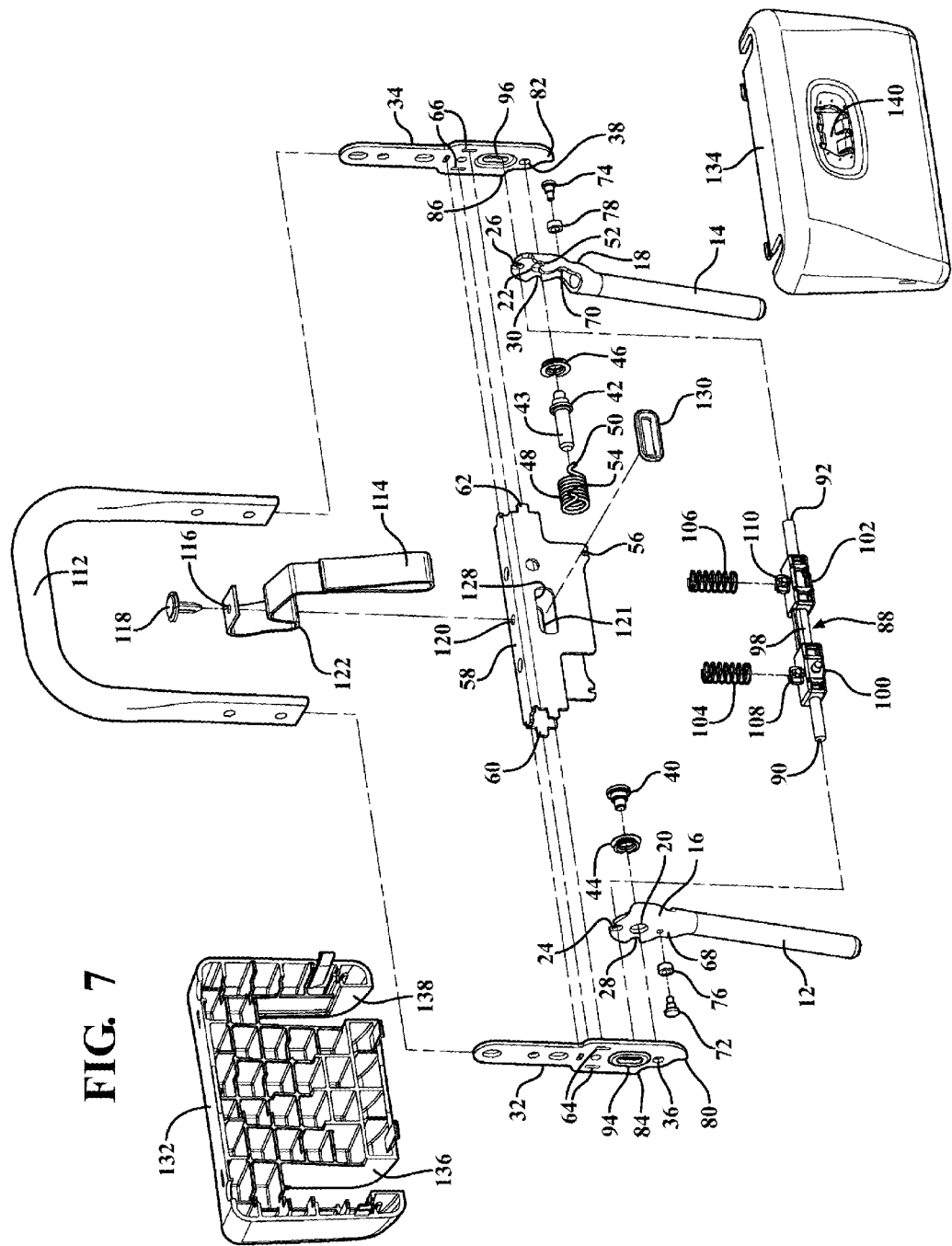
FIG. 7 is an exploded view of the headrest assembly.

As further best shown in the exploded view of FIG. 7, aligning apertures, see inner perimeter surfaces 20 and 22, extend through an interior of each sector 16 and 18. An arcuate profile edge associated with each of the sectors further exhibits a first pair of aligning notches 24 and 26 corresponding to an upright headrest design position, with a second pair of aligning notches 28 and 30 further corresponding to a rotated or dump headrest position.

A pair of side supports 32 and 34 are provided with each including, at a lowermost proximate location, an aperture (see inner perimeter walls 36 and 38). The lower portions of the side supports 32 and 34 are positioned in outboard overlaying fashion relative to the inner fixed supported sectors 20 and 22, such that a pair of rivets, including a first rivet 40 associated with sector 20 and side support 32, and a second spring supporting rivet 42 associated with sector 22 and side support 34, are inserted through the aligning apertures and in order to mount the side supports 32 and 34 to the sectors 20 and 22.

Bushings 44 and 46 are provided for assisting in installing the rivets 40 and 42 through the aligning pairs of apertures associated with the sectors and side supports. Selected and elongated rivet 42 further exhibits an inwardly extending stem portion 43 upon which is seated a torsion spring 48, a first end 50 of which engages a notched location 52 established upon sector 18 at a location offset from its pivotal location 22.

An opposite second end 54 of the spring engages an underside notched location 56 (see again in FIG. 7) which is associated with a lowermost extending edge of a widthwise extending housing 58. The housing exhibits a three sided article exhibiting a substantially "U" shape in cross section and, at opposite extending edges of its spaced apart sides, exhibits laterally projecting tabs (see at 60 and 62 in FIG. 7), these respectively seating within recessed slots 64 and 66 associated with the side supports 32 and 34 for assembling the housing 58 in widthwise extending fashion between the fixed side supports 12 and 14.

Also secured to exterior locations of sector 16 and 18, in particular further lower positioned apertures shown at 68 and 70 in FIG. 7, area a pair of stop rivets 72 and 74 with associated bushings 76 and 78. Upon mounting the stop rivets 72 and 74 to the associated sectors 16 and 18, the overlapping side supports 32 and 34 engage the stop rivets in both the upright position (via a bottom edge configuration 80 and 82 in each support 32 and 34 defining an upright most position) as well as a forward folded position (via further shoulder locations 84 and 86 established in arcuate offset fashion and defining a lowermost dump position).

A width extending lift and lock rod assembly (see as generally depicted at 88) is best illustrated in the exploded view of FIG. 7 and includes an inner extending rod which is dimensioned so that opposite ends 90 and 92 thereof extend through elongated channels 94 and 96 defined in the side supports 32 and 34. An outer, typically plasticized and hollowed interior shell 98 (see FIGS. 1 and 7) receives a central portion of the rod in inserting fashion as shown (with the opposite ends 90 and 92 projecting beyond the ends of the shell and through the sectors 16 and 18 and side supports 30 and 32 as shown). The outer shell 98 further incorporates a pair of spaced apart bushing supports 100 and 102 projecting upwardly from width spaced locations. Compression springs 104 and 106 are seated respectively upon cylindrical supports 108 and 110 arranged upon the bushings 100 and 102.

Upon assembly, the ends 90 and 92 of the rod are biased downwardly within the elongated side support channels 94 and 96 by virtue of the spring 104 and 106 forces exerted against the top underside of the housing 58 pushing down on the rod and outer shell 98 and bushing supports 100 and 102. Referring back again to FIG. 7, additional structural components include the provision of a generally "U" shaped upper tubular component 112, opposite downwardly extending ends of which being secured against or over opposing upper ends of the side supports 32 and 34. The upper tubular component 112, in combination with the housing 58 and side supports 32 and 34 define a headrest support frame and are installed within an open interior associated with an upper headrest bun (see in phantom at 4 in FIG. 1).

An elongated strap 114 is provided and is secured, at a first end location 116 to an upper surface of the housing 58, this further depicted by fastener 118 which installs through an aperture at the end location 116 and into a further aperture 120 defined in the top surface of the "U" cross sectional shaped and three dimensional interior defining housing 58. The length of the strap extending from the end secured location 116 first passes through a rectangular slot 121 (see FIG. 1) defined in a front side of the housing 58 and includes an intermediate portion 122 which is looped underneath a midpoint of the laterally extending lift rod.

This is best depicted in each of side cutaways of FIGS. 8-10, in which the strap, after passing through the front housing slot 121, extends through a first width extending aperture (also slot) 124 defined along a first upper corner edge of the rod receiving shell 98, with the intermediate portion 122 looped underneath the rod (see as shown at 88 but which is understood to define the integral tubular body extending between the integrally formed and extending ends 90 and 92). The strap then projects out through a further upper corner edge slot 126 defined in the shell 98 and, following that, outwardly through a rear housing face located rectangular slot 128 which is covered by a plasticized and rectangular insert 130. In this manner, an exposed loop end of the strap (again at 114) is capable of being grasped by either a rear row seated passenger or, more typically, by an individual reaching into the vehicle from a rear trunk or open hatchback.

Also shown in FIG. 7 are front 132 and rear 134 cover portions which are capable of sandwich assembled over the housing 58 and associated components associated with the assembled headrest, and such as which can define a three dimensional rotationally supporting package over which the headrest bun 4 is supported. Additional to tab and slot fasteners defined upon opposing inner surfaces of the cover portions, the front cover portion 132 can include seating locations (see at 136 and 138) for receiving the downwardly extending side supports 12 and 14, with the rear cover portion 134 further depicting an access location 140 overlaying the rear slot 128 situated upon the housing. For purposes of ease of illustration, the cover components 132 and 134 illustrated in exploded fashion in FIG. 7 are not included with the other views depicting the mechanical operation of the headrest assembly.

Lifting or elevating the inner supported bar and associated ends 90 and 92 results from pulling on the looped end of strap 114, such that the intermediate and underneath looped location 122 pushes upwardly against the bar and in a counter biasing direction to the downwardly and seating forces exerted by the springs 104 and 106. In this fashion, the rod is caused to lift out of seating engagement with the first upright design located pairs of notches 24 and 26 associated with the side sectors 16 and 18 (see as best depicted in FIG. 8).

Figure 6:
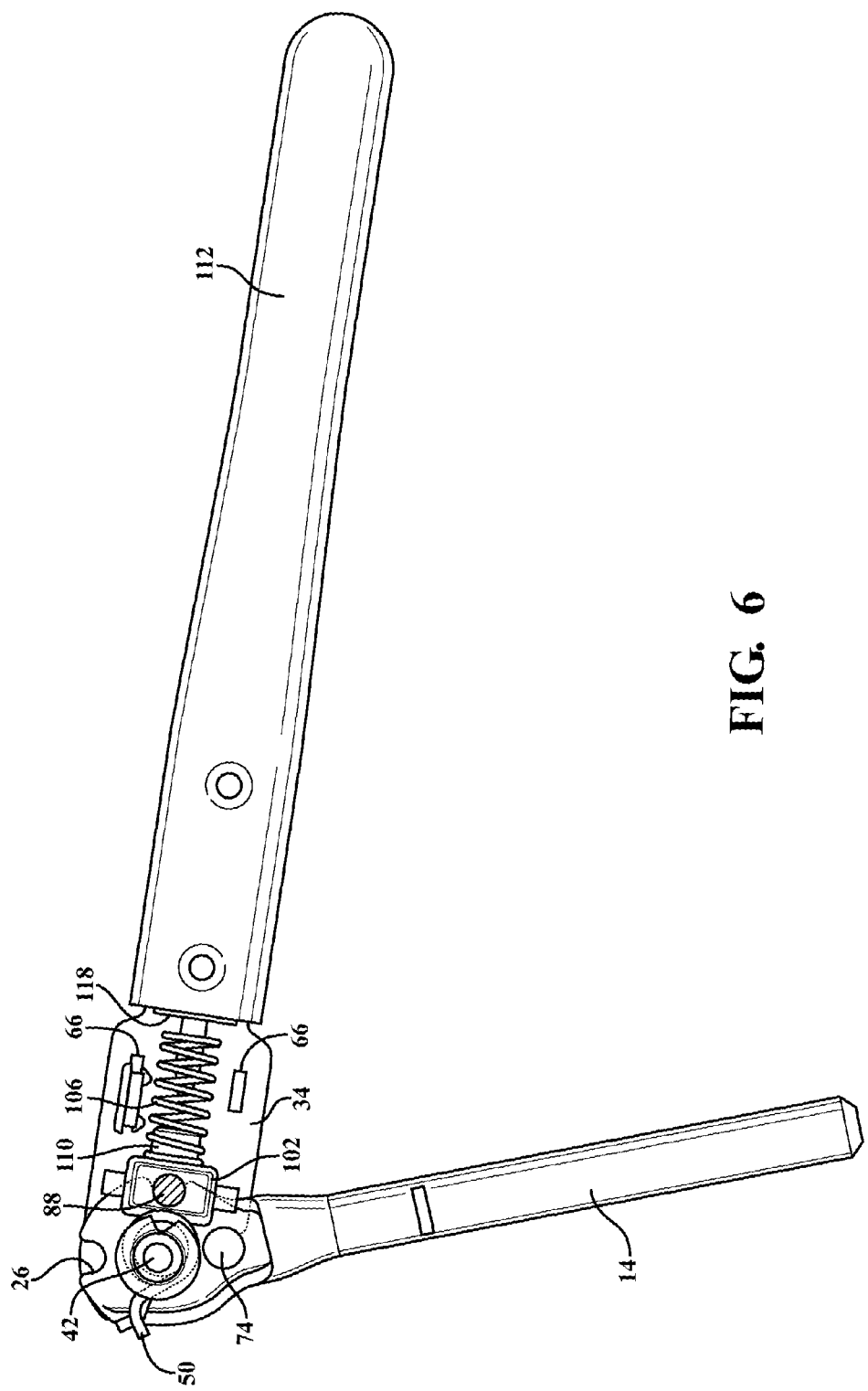
FIG. 6 is an illustration succeeding that depicted in FIG. 4 showing the headrest in a forward rotated position.

Having been unseated from the first pair of upright design notches, the pivotally supported structure (again including housing 58, side supports 32 and 34, and upper "U" support tube 112) is influenced to rotate forwardly (see FIG. 9) by virtue of the rotating forces exerted by the opposite ends 50 and 54 of the torsion spring 48 mounted to the elongated and spring supporting rive 42 in proximity to the selected sector 18. At this point, the laterally projecting ends 90 and 92 of the rod slide along exterior arcuate surfaces (see by example shown at 142 for selected sector 18 in FIGS. 8-10). As further shown in FIG. 10, and upon rotating to a forward most position at which the configured locations 84 and 86 of the side supports 32 and 34 abut the stop rivets 72 and 74, the rod ends 90 and 92 are positioned in alignment with the second pair of aligning notches 28 and 30, at which point the forces associated with the springs 104 and 106 outwardly/downwardly displace the rod ends into engagement to the position depicted in FIG. 6.

Reverse upright rotation of the headrest is caused by pulling on strap 114, concurrent with forcibly grasping the surrounding bun 4 and reverse rotating to the upright position of FIG. 1 (in counter biasing fashion to the forward dump forces exerted by the torsional spring 48), at which point the strap is released and the bar (ends 90 and 92) is again biased downwardly by the force of the springs 104 and 106 exerted against the inside top of the housing 58 in order to reseat the bar within the upright design notches 24 and 26 defined in the sectors 16 and 18.

Having described our invention, other and additional preferred embodiments will become apparent to those skilled in the art to which it pertains, and without deviating from the scope of the appended claims. This can include redesigning the headrest for pivoting in a reverse (rearward) direction relative to the seatback. Additional variants can also contemplate incorporating a remote latch for triggering rotational dump of the headrest (separate from the pull strap), such being incorporated into the seatback dump linkage for facilitating automated headrest release upon the seatback achieving a specified forward dump position.

I claim:

1. A pivoting headrest, comprising:
   a pair of upwardly projecting supports associated with a vehicle seatback and terminating at a pair of spaced apart sectors;
   a headrest bun supporting frame pivotally secured to said sectors and including a pair of elongated side members and a lower interconnecting housing;
   a widthwise extending rod supported within said housing, opposite extending ends of said rod engaging said sectors at a first upright position and seated within channels in said side supports; and
   a widthwise extending shell through which extends a central portion of said rod, a pair of spaced apart bushing supports extending from said shell and in turn seating thereupon a pair of compression springs exerting a biasing force against a top underside of said housing;
   said rod being biased in a first engaging direction against said sectors and, upon being displaced in a reverse direction, causing its ends to unseat from said sectors and said bun to rotate about said sectors to a dump position.

2. The headrest as described in claim 1, said sectors further comprising a first pair of edge configured notches corresponding to an upright design position and a second arcuately offset pair of notches corresponding to a rotated fold position.

3. The headrest as described in claim 1, further comprising a strap connected at a first end to said housing and extending within said housing and underneath said bar, a projecting loop end of said strap being accessible from a rear of said headrest and, upon being pulled, upwardly displacing said rod along said side support channels to the unseating position from said sectors.

4. The headrest as described in claim 3, said headrest frame further comprising a "U" shaped tubular component engaging said side members.

5. The headrest as described in claim 1, further comprising a pair of rivets establishing pivotal engagement between said headrest bun support frame and said sectors.

6. The headrest as described in claim 5, a selected rivet further comprising an elongated and inwardly extending stem upon which is seated a torsion spring, a first end of said spring engaging a location established upon a proximately located sector at a location offset from its pivotal location, a second end of said spring engaging a location associated with said housing and in order to bias said housing to the dump position.

7. The headrest as described in claim 1, further comprising stop rivets projecting from exterior surfaces of said sectors, said side members of said headrest frame each further comprising bottom edge configurations which abut said stop rivets in the upright position, additional shoulder locations associated with said side members abutting said stop rivets in the rotated dump position.

8. The headrest as described in claim 4, further comprising front and rear cover portions assembled over said pivotal housing and through which projects said tubular component, said looped end of said strap extending through an opening associated with a rear assembled cover portion.

9. A pivoting headrest, comprising:
   a pair of upwardly projecting supports associated with a vehicle seatback and terminating at a pair of spaced apart sectors, said sectors further comprising a first pair of edge configured notches corresponding to an upright design position and a second arcuately offset pair of notches corresponding to a rotated fold position;

a headrest bun supporting frame pivotally secured to said sectors and including a pair of elongated side members and a lower interconnecting housing;

a widthwise extending rod supported within said housing, opposite extending ends of said rod engaging said sectors at a first upright position and seated within channels in said side supports;

a strap connected at a first end to said housing and extending within said housing and underneath said rod, a projecting loop end of said strap being accessible from a rear of said headrest and, upon being pulled, upwardly displacing said rod along said side support channels to the unseating position from said sectors;

said rod being biased in a first engaging direction against said sectors and, upon being displaced in a reverse direction, causing its ends to unseat from said sectors and said bun to rotate about said sectors to a dump position.

10. The headrest as described in claim 9, further comprising a widthwise extending shell through which extends a central portion of said rod, a pair of spaced apart bushing supports extending from said shell and in turn seating thereupon a pair of compression springs exerting a biasing force against a top underside of said housing.

11. The headrest as described in claim 10, said headrest frame further comprising a "U" shaped tubular component engaging said side members.

12. The headrest as described in claim 9, further comprising a pair of rivets establishing pivotal engagement between said headrest bun support frame and said sectors.

13. The headrest as described in claim 12, a selected rivet further comprising an elongated and inwardly extending stem upon which is seated a torsion spring, a first end of said spring engaging a location established upon a proximately located sector at a location offset from its pivotal location, a second end of said spring engaging a location associated with said housing and in order to bias said housing to the dump position.

14. The headrest as described in claim 9, further comprising stop rivets projecting from exterior surfaces of said sectors, said side members of said headrest frame each further comprising bottom edge configurations which abut said stop rivets in the upright position, additional shoulder locations associated with said side members abutting said stop rivets in the rotated dump position.

15. The headrest as described in claim 11, further comprising front and rear cover portions assembled over said pivotal housing and through which projects said tubular component, said looped end of said strap extending through an opening associated with a rear assembled cover portion.

16. A pivoting headrest, comprising:

a pair of upwardly projecting supports associated with a vehicle seatback and terminating at a pair of spaced apart sectors, said sectors further comprising a first pair of edge configured notches corresponding to an upright design position and a second arcuately offset pair of notches corresponding to a rotated fold position;

a headrest bun supporting frame pivotally secured to said sectors and including a pair of elongated side members and a lower interconnecting housing;

a pair of rivets establishing pivotal engagement between said headrest bun support frame and said sectors, a selected rivet further comprising an elongated and inwardly extending stem upon which is seated a torsion spring, a first end of said spring engaging a location established upon a proximately located sector at a location offset from its pivotal location, a second end of said spring engaging a location associated with said housing and in order to bias said housing to the dump position;

a widthwise extending rod supported within said housing, opposite extending ends of said rod engaging said sectors at a first upright position and seated within channels in said side supports;

a strap connected at a first end to said housing and extending within said housing and underneath said rod, a projecting loop end of said strap being accessible from a rear of said headrest and, upon being pulled, upwardly displacing said rod along said side support channels to the unseating position from said sectors;

said rod being biased in a first engaging direction against said sectors and, upon being displaced in a reverse direction, causing its ends to unseat from said sectors and said bun to rotate about said sectors to a dump position.

17. The headrest as described in claim 16, said headrest frame further comprising a "U" shaped tubular component engaging said side members.

18. The headrest as described in claim 16, further comprising stop rivets projecting from exterior surfaces of said sectors, said side members of said headrest frame each further comprising bottom edge configurations which abut said stop rivets in the upright position, additional shoulder locations associated with said side members abutting said stop rivets in the rotated dump position.

19. The headrest as described in claim 17, further comprising front and rear cover portions assembled over said pivotal housing and through which projects said tubular component, said looped end of said strap extending through an opening associated with a rear assembled cover portion.

20. A pivoting headrest, comprising:

a pair of upwardly projecting supports associated with a vehicle seatback and terminating at a pair of spaced apart sectors;

a headrest bun supporting frame pivotally secured to said sectors and including a pair of elongated side members and a lower interconnecting housing;

a widthwise extending rod supported within said housing, opposite extending ends of said rod engaging said sectors at a first upright position and seated within channels in said side supports;

a strap connected at a first end of said housing and extending within said housing underneath said rod, a projecting end of said strap being accessible from a rear of said headrest and, upon being pulled, upwardly displacing said rod along said side support channels to the unseating position from said sectors;

said rod being biased in a first engaging direction against said sectors and, upon being displaced in a reverse direction, causing its ends to unseat from said sectors and said bun to rotate about said sectors to a dump position.

* * * * *